United States Patent
Räsänen

(10) Patent No.: US 6,292,496 B1
(45) Date of Patent: Sep. 18, 2001

(54) ASYNCHRONOUS DATA TRANSMISSION METHOD AND ARRANGEMENT

(75) Inventor: Juha Räsänen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/068,153

(22) PCT Filed: Nov. 13, 1996

(86) PCT No.: PCT/FI96/00617

§ 371 Date: Jun. 19, 1998

§ 102(e) Date: Jun. 19, 1998

(87) PCT Pub. No.: WO97/18660

PCT Pub. Date: May 22, 1997

(30) Foreign Application Priority Data

Nov. 15, 1995 (FI) .......................................... 955497

(51) Int. Cl.[7] .................................................. H04J 3/06
(52) U.S. Cl. ...................... 370/503; 370/315; 370/395; 370/401; 370/465; 370/305
(58) Field of Search ..................... 370/276, 277, 370/278, 315, 316, 360, 395, 401, 402, 501, 503, 509, 510, 512, 465, 466, 467, 474, 305

(56) References Cited

U.S. PATENT DOCUMENTS

| | | | |
|---|---|---|---|
| 3,824,597 | * 7/1974 | Berg | 370/276 |
| 4,949,333 | * 8/1990 | Gulick et al. | 370/276 |
| 5,412,660 | 5/1995 | Chen et al. | 370/110.1 |
| 5,425,031 | * 6/1995 | Otsuka | 370/360 |

OTHER PUBLICATIONS

Fred Halsall, "Data Communications, Computer Networks and OSI" 1987, Addison–Wesley Publishing Company, pp. 68–76.

IBM, Technical Disclosure Bulletin, vol. 30, No. 7, Dec. 1987, "Asynchrone Converter" pp. 210–211.

* cited by examiner

*Primary Examiner*—Dang Ton
*Assistant Examiner*—Shick Hom
(74) *Attorney, Agent, or Firm*—Pillsbury Winthrop LLP

(57) ABSTRACT

An asynchronous data transmission method and a telecommunication system for transmitting asynchronous data characters and status information of a terminal interface and possibly other control and synchronization information through a synchronous traffic channel or a set of synchronous traffic channels. The system has an arrangement including a transmission protocol utilizing an asynchronous-to-synchronous conversion. The transmission protocol has protocol data units for transmission over the traffic channel or set of traffic channels. Each protocol data unit contains a predetermined number of terminal interface asynchronous data characters without start and stop bits, and the terminal interface status information and possibly other control or synchronization information, concatenated between a common start bit and a common stop bit.

13 Claims, 4 Drawing Sheets

| OCTET NO. | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D37 | D38 | D39 | D40 | D41 | D42 | S8 |
| 8 | 1 | D43 | D44 | D45 | D46 | D47 | D48 | S9 |

V.110 FRAME

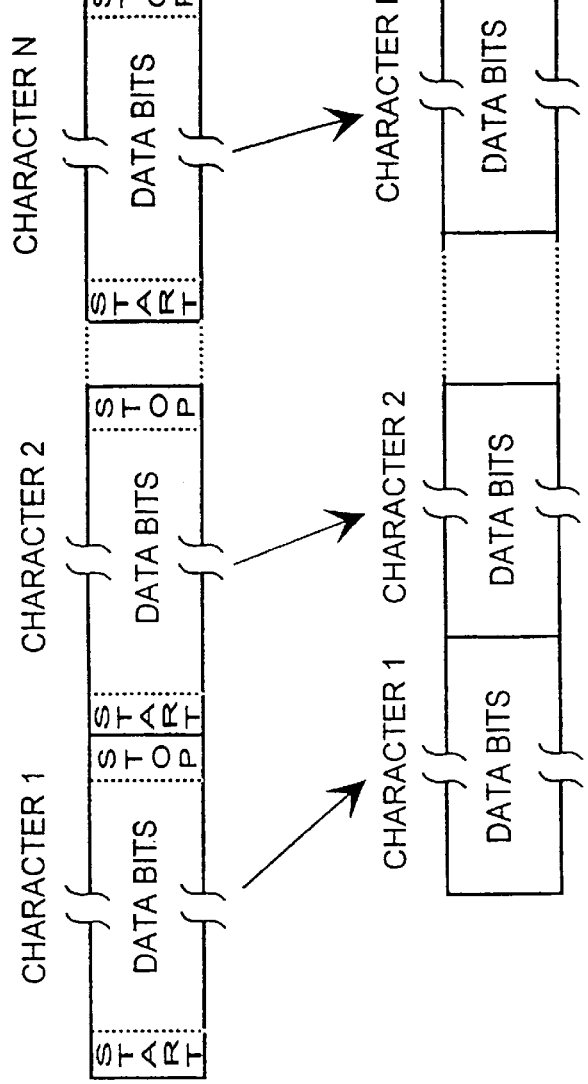
Fig. 5
Fig. 6
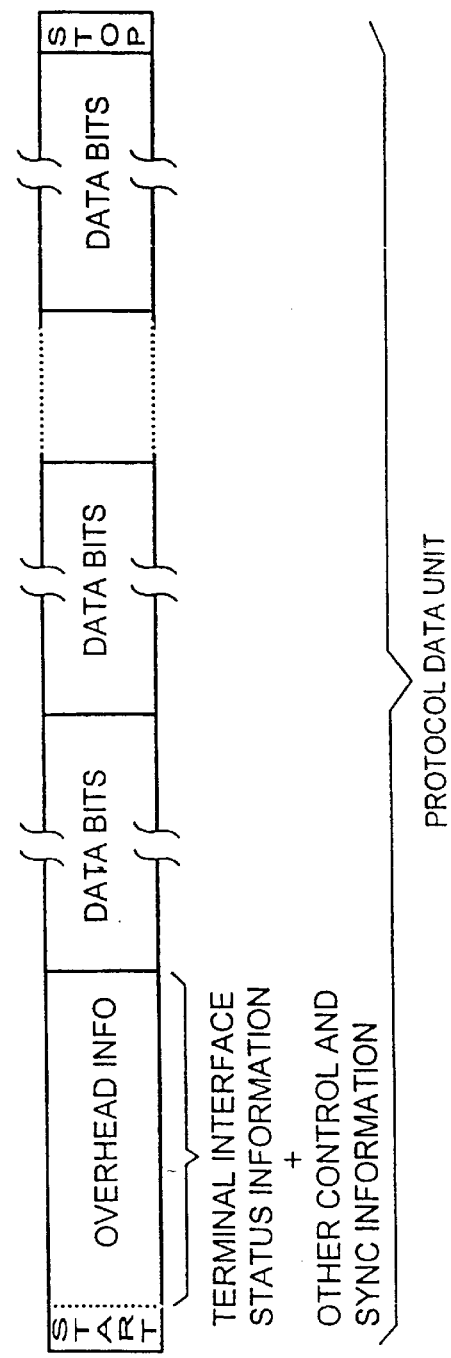
Fig. 7

ASYNCHRONOUS DATA TRANSMISSION METHOD AND ARRANGEMENT

FIELD OF THE INVENTION

The present invention relates to asynchronous data transmission in a telecommunication system, especially in a case where the maximum data rate of the traffic channel is equal to one of the user data rates at the terminal interface.

BACKGROUND OF THE INVENTION

Mobile systems generally refer to different telecommunication systems that enable private wireless data transmission for subscribers moving within the system. A typical mobile system is a public land mobile network (PLMN). The PLMN comprises fixed radio stations (base stations) located in the service area of the mobile network, the radio coverage areas (cells) of the base stations providing a uniform cellular network. A base station provides in the cell a radio interface (air interface) for communication between a mobile station and the PLMN. Since mobile stations can move in the network and they have access to the PLMN through any base station, the PLMNs are provided with complicated arrangements for subscriber data management, authentication and location management of mobile subscribers, for handovers (a change of a base station during a call) etc. The networks are also provided with services that support the transmission of information other than the usual speech calls (speech service), such as data, facsimile, video image, etc. These new services have required a considerable amount of developmental work and new arrangements in the networks.

Another area of mobile systems includes satellite-based mobile services. In a satellite system, radio coverage is obtained with satellites instead of terrestrial base stations. The satellites are located on an orbit circling the earth and transmitting radio signals between mobile stations (or user terminals UT) and land earth stations (LES). The beam of the satellite provides on the earth a coverage area, i.e. a cell. The coverage areas of individual satellites are arranged to form continuous coverage so that a mobile station is located at all times within the coverage area of at least one satellite. The number of the satellites needed depends on the desired coverage. Continuous coverage on the surface of the earth might require for example 10 satellites.

Subscriber mobility requires similar arrangements in satellite mobile systems as in the PLMNs, i.e. subscriber data management, authentication and location management of mobile subscribers, handovers, etc. The satellite systems should also support similar services as the PLMNs.

One way of implementing these requirements in satellite mobile systems is to use existing PLMN arrangements. In principle this alternative is very simple since a satellite system can be basically compared to a base station system of a mobile system having an incompatible radio interface. In other words, it is possible to use a conventional PLMN infrastructure where the base station system is a satellite-system. In such a case, the same network infrastructure could in principle even contain both conventional PLMN base station systems and satellite "base station systems".

There are many practical problems related to the adaptation of the PLMN infrastructure and a satellite system, however. A problem apparent to the Applicant is that a PLMN traffic channel and a traffic channel of a "radio interface" in a satellite system differ considerably. Examine an example where the PLMN is the Pan-European digital mobile system GSM (Global System for Mobile Communication) and the satellite mobile system is the Inmarsat-P system that is currently under development.

A traffic channel in the GSM system supports data transmission at the user rates of 2400, 4800, 7200 and 9600 bit/s. In the future, high-speed data services (HSCSD=High speed circuit switched data) employing two or more traffic channels at the radio interface (multi-slot access) also support higher user rates (14400 bit/s, 19600 bit/s, . . . ). A data connection provided by one traffic channel is V.110-rate-adapted. A V.110 connection is a digital transmission channel that was originally developed for ISDN (Integrated Services Digital Network) technology and that is adapted to a V.24 interface. In V.110 frames, terminal interface status information (V.24 interface control signals), such as CT105 (RTS=ready to send), CT108 (DTR=data terminal ready), CT106 (CTS=clear to send), CT107 (DSR=data set ready) and CT109 (CD=Data carrier detect), is also transmitted in both transmission directions in addition to the user data. Further, in multichannel transparent HSCSD data service it is also necessary to transfer intersubchannel synchronization information. The aforementioned additional information increases the bit rate at the radio interface higher than the actual user rate. The radio interface rates corresponding to the user rates of 2400, 4800 and 9600 bit/s are 3600, 6000 and 12000 bit/s. In addition, the traffic channel employs channel coding that aims at decreasing the effect of transmission errors.

The Inmarsat-P satellite system requires that standard data rates up to 4800 bit/s can be supported by one traffic channel (e.g. 1200, 2400, 4800 bit/s) and that standard data rates exceeding 4800 bit/s (e.g. 9600, 14400, 19200 bit/s, etc.) can be supported by using several parallel traffic channels, such as in the HSCSD service of the GSM system.

In the Inmarsat-P satellite system, a data rate of one traffic channel at the radio interface is at most 4800 bit/s, which equals the user data rate of 4800 bit/s at the terminal interface. In a data service employing two traffic channels the data rate at the radio interfaces equals the user data rate of 9600 bit/s at the terminal interface. A problem occurs when not only the user data but also the above-described terminal interface status information and possible intersubchannel synchronization information should be transmitted over the radio interface. Therefore the protocol data unit, i.e. the frame structure, used by the satellite system at the radio interface should be defined to carry the aforementioned control and synchronization information over the radio interface. One manner would be to use directly the GSM system arrangement, i.e. a V.110-based frame structure, also at the radio interface of the satellite system. However, this would be a very complicated arrangement and it would significantly reduce the user data rates available. A single traffic channel could not support the user data rate of 4800 bit/s since the V.110 frame structure and the terminal interface status information increase the actual data rate higher than 4800 bit/s. Therefore the highest standard user data rate on one traffic channel would be 2400 bit/s. For the same reason, a two traffic channel data service could not support the user rate of 9600 bit/s, but the highest standard user data rate would be 4800 bit/s (or in some systems 7200 bit/S). A corresponding decrease in the available data rates would also occur in data services employing more than two traffic channels. Such an arrangement where the overhead information causes a significant loss of capacity would not be satisfactory.

A similar problem can also occur when connecting other types of radio interfaces, such as wireless telephone systems, to PLMNs.

DISCLOSURE OF THE INVENTION

The object of the present invention is an arrangement supporting the transmission of asynchronous data characters, terminal interface status information and possibly other control or synchronization information through a transparent traffic channel having a data rate equal to the user data rate at the terminal interface.

This is achieved with an asynchronous data transmission method for transmitting terminal interface asynchronous data characters and status information and possibly other control or synchronization information through a traffic channel or a set of traffic channels in a telecommunication system. The method is characterized by the steps of A) at the transmitting end:

removing a predetermined number of start bits and stop bits from between the asynchronous data characters, concatenating the asynchronous data characters lacking start and stop bits, and said terminal interface status information and possibly other control or synchronization information into a protocol data packet beginning with a start bit and ending with a stop bit, processing the protocol data packet according to an asynchronous-to-synchronous conversion, transmitting the processed protocol data packet to the receiving end through said synchronous traffic channel or set of traffic channels, B) at the receiving end extracting the asynchronous data characters, the terminal interface status information and the possible other control or synchronization information from the protocol data unit, adding start and stop bits to the data characters.

The invention also relates to an arrangement for transmitting terminal interface asynchronous data characters and status information and possibly other control and synchronization information through a traffic channel or a set of traffic channels in a telecommunication system. The arrangement comprises a transmission protocol utilizing an asynchronous-to-synchronous conversion, said transmission protocol comprising protocol data units for transmission over said traffic channel or set of traffic channels, each protocol data unit containing a predetermined number of terminal interface asynchronous data characters without start and stop bits, and said terminal interface status information and possibly other control or synchronization information, concatenated between a common start bit and a common stop bit.

When asynchronous characters are transmitted through a synchronous traffic channel, an asynchronous-to-synchronous conversion is required at the transmitting end. This conversion determines the rate adaptation, underspeed handling and overspeed handling. Underspeed handling means that additional stop bits (STOP) are added between the asynchronous characters before transmission. Overspeed handling means that STOP bits are sometimes removed from between the asynchronous characters before transmission. Such a conversion is defined for example in the ITU-T recommendation V.14 that also sets the limits for the underspeed and the overspeed.

In the invention, the transmission of the terminal interface status information and other possible control or synchronization information is embodied utilizing the synchronous-to-asynchronous conversion. At first, as many start bits (START) and stop bits (STOP) are removed from between the asynchronous characters as allowed by the specifications of the synchronous-to-asynchronous conversion used. Asynchronous characters lacking START and STOP bits are concatenated. The terminal interface status information and possibly other control or synchronization information is concatenated with these concatenated data characters. The concatenated asynchronous data characters, status information and the possible other control and synchronization information are provided with a common START bit and a common STOP bit. Standard underspeed and overspeed operations are then applied to the new protocol data unit PDU formed in this way, i.e. STOP bits can be removed from between the protocol data units or additional STOP bits can be added thereto. Also, standard rate adaptation is applied to this new protocol data unit, i.e. STOP bits can be added between the protocol data units. The protocol data units are transmitted over a synchronous traffic channel to a receiver. The receiver is synchronized with the START bits and it carries out operations that are reverse with respect to those performed by the transmitter. In other words, the receiver extracts the asynchronous data characters, the terminal interface status information and the possible other control and synchronization information from the protocol data unit. The receiver thereafter adds the START and STOP bits to the data characters and adapts the status information to the terminal interface. If the transmission is high-speed transmission employing a multichannel connection, the aforementioned other control or synchronization information contains interchannel synchronization information. After having been synchronized with the START bits, the receiver then extracts this information in order to be able to restore the order of the data bits received from different channels.

Due to the invention, the overhead information that is transmitted instead of the deleted start and stop bits does not increase the number of the bits to be transmitted, wherefore the data rate of the traffic channel may be the same as the user data rate at the terminal interface. In high-rate data transmission, a data connection may comprise a set of two or more traffic channels, so that the total data rate of the set of traffic channels can be the same as the user data rate at the terminal interface.

BRIEF DESCRIPTION OF THE DRAWINGS

In the following, the invention will be described by means of preferred embodiments with reference to the accompanying drawings, in which FIG. 5 shows a conventional asynchronous character string, FIGS. 6 and 7 illustrate the formation of the protocol data unit according to the invention.

PREFERRED EMBODIMENTS OF THE INVENTION

The present invention can be applied for asynchronous data transmission through any traffic channel having a data rate equal to the user data rate at the terminal interface. In high-rate data transmission, a data connection may comprise a number of parallel traffic channels, so that the total data rate of the traffic channels equals the user data rate at the terminal interface. The preferred embodiments of the invention will be described by using as an example the interworking between a GSM-based mobile system and the Inmarsat-P satellite system connected thereto as a "base station system". However, the invention is not to be restricted to these systems.

The structure and operation of the GSM mobile system are well known to a person skilled in the art and they are defined in the GSM specification of the ETSI (European Telecommunications Standards Institute). Reference is also made to *GSM System for Mobile Communication* by M. Mouly and M. Pautet (Palaiseau, France, 1992, ISBN:2-9507190-0-7). GSM-based mobile systems include DCS1800 (Digital Communication System) and the US digital cellular system PCS (Personal Communication System).

Figure 1:
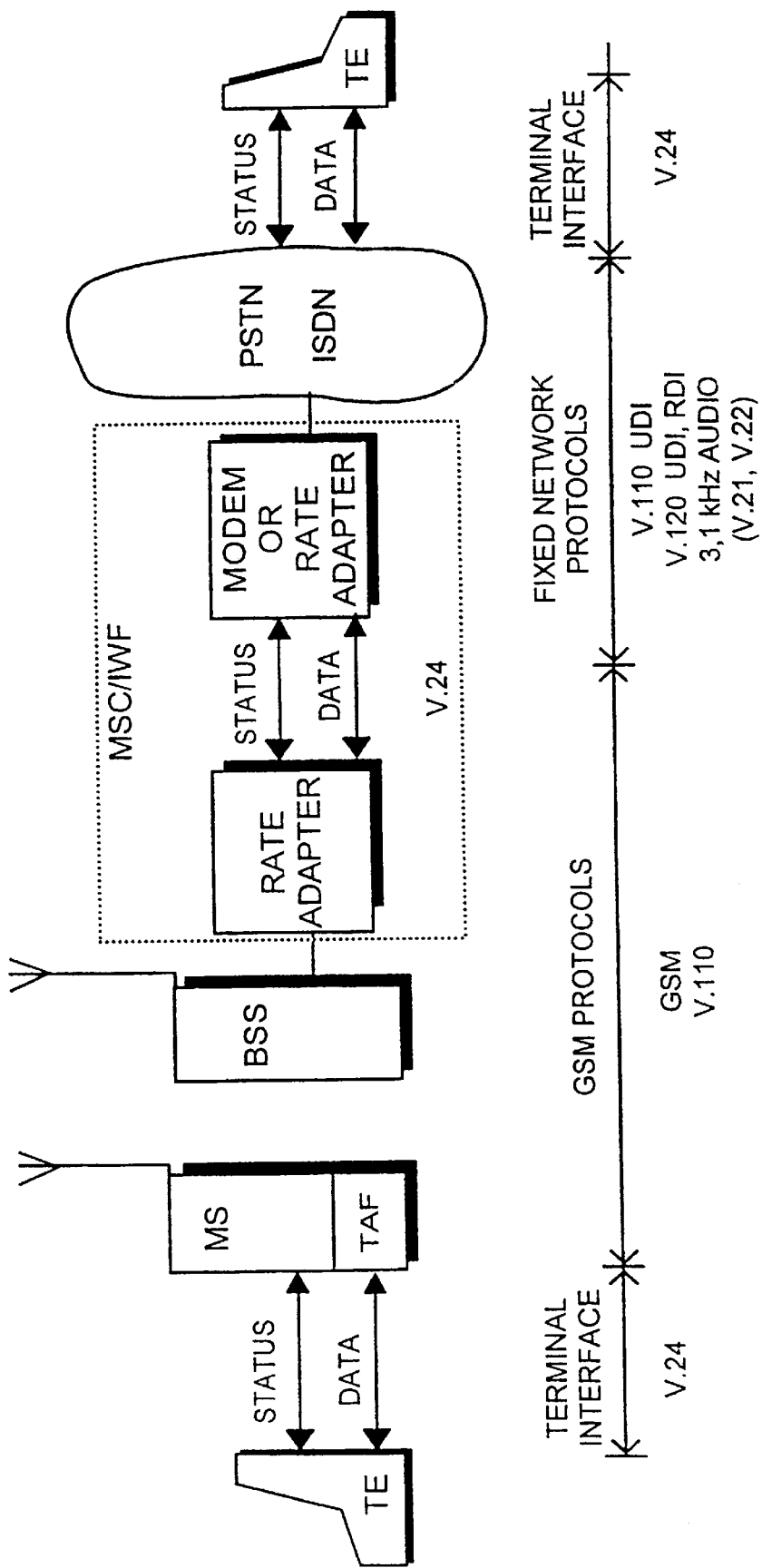
FIG. 1 is a block diagram illustrating a configuration according to the GSM recommendations for data transmission.

The configuration according to the GSM recommendations for data transmission is illustrated in FIG. 1. The basic structure of the GSM mobile system is shown in FIG. 1. The GSM structure comprises two parts: a base station system BSS and a network subsystem NSS. The BSS and the mobile stations MS communicate via radio connections. In the BSS, each cell is serviced by a base station BTS (not shown in the figure). A number of base stations are connected to a base station controller BSC (not shown in FIG. 1) the function of which is to control the radio frequencies and channels used by the BTS. The BSSs are connected to a mobile services switching centre MSC. Certain MSCs are connected to other telecommunication networks, such as the public switched telephone network PSTN and the ISDN.

In the GSM system, a data connection is established between a terminal adaptation function TAF of an MS and an interworking function IWF in the mobile network (usually in the MSC). In data transmission occurring in the GSM network, this connection is a V.110 rate-adapted, UDI-coded digital full-duplex connection that is adapted to V.24 interfaces. The V.110 connection described herein is a digital transmission channel that was originally developed for ISDN (Integrated Services Digital Network) technology, that is adapted to the V.24 interface, and that also provides the possibility of transmitting V.24 statuses (control signals). The CCITT recommendation for a V.110 rate-adapted connection is disclosed in the CCITT Blue Book: V.110. The CCITT recommendation for a V.24 interface is disclosed in the CCITT Blue Book: V.24. In non-transparent data services, a GSM connection also employs a radio link protocol RLP. The TAF adapts the data terminal TE connected to the MS to the aforementioned GSM V.110 data connection which is established over a physical connection utilizing one or several traffic channels (HSCSD). The IWF comprises a rate adapter that adapts the GSM V.110 data connection to the V.24 interface and to a data modem or another rate adapter depending on whether the connection is extended to the PSTN or the ISDN. The ISDN protocols may be for example V.110 or V.120. In the ISDN or the PSTN, a data connection is established for example to another TE. The V.24 interface between the MS and the TE is called here a terminal interface. A corresponding terminal interface is also located in the IWF as well as in the other TE in the ISDN or the PSTN.

A GSM traffic channel supports data transmission with the user rates of 2400, 4800, 7200 and 9600 bit/s. In the future, high-speed data services (HSCSD=High speed circuit switched data) employing two or more traffic channels at the radio interface (multi-slot access) also support higher user rates (14400 bit/s, 19600 bit/s, . . . ). In V.110 frames, terminal interface status information (V.24 interface control signals), such as CT105 (RTS=ready to send), CT108 (DTR=data terminal ready), CT106 (CTS=clear to send), CT107 (DSR=data set ready) and CT109 (CD=Data carrier detect), is also transmitted in both transmission directions in addition to the user data. Further, in multichannel transparent HSCSD data service it is also necessary to transfer intersubchannel synchronization information. The traffic channel employs channel coding that aims at decreasing the effect of transmission errors. Channel coding and the aforementioned additional information increase the bit rate at the radio interface higher than the actual user rate. The radio interface rates corresponding to the user rates of 2400, 4800 and 9600 bit/s are 3600, 6000 and 12000 bit/s.

Figures 2, 3:
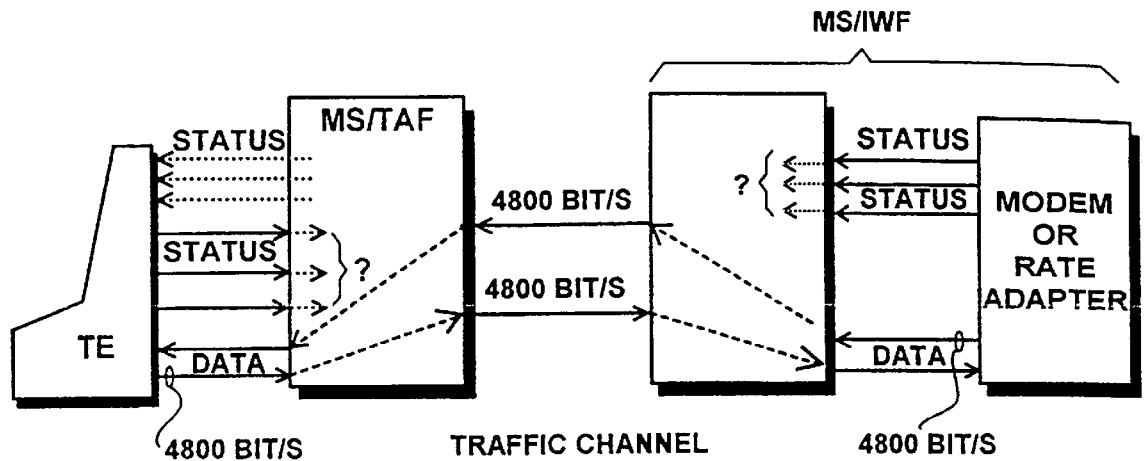
FIG. 2 shows a V.110 frame structure.
FIG. 3 is a block diagram generally illustrating the problem behind the invention, related to a traffic channel having a data rate equal to the user data rate.

The frame structure used for data transmission over the V.110 connection is shown in FIG. 2. The frame consists of 80 bits. Octet 0 contains binary zeros, whereas octet 5 contains a binary one followed by seven E bits. Octets 1 to 4 and 6 to 9 contain a binary one in bit position 1, a status bit (S or X bit) in bit position 8 and six data bits (D bits) in bit positions 2 to 7. The bits are transmitted from left to right and from top to bottom. A frame thus comprises 48 bits of user data, i.e. D1 to D48. Bits S and X are used to transfer, in data transmission mode, channel control information related to the data bits. Four status bits S1, S3, S6 and S8 are used to transfer CT108 (Data Terminal Ready) from the MS to the IWF and to transfer the CT107 status signal from the IWF to the MS. Two status bits S4 and S9 are used to transmit the CT105 status signal from the MS to the IWF and to transfer the CT109 status signal from the IWF to the MS. Two X status bits are used to transmit the CT106 status signal or the transmission synchronization or flow control information between the adaptors. When the terminal equipments are X.21 terminal equipments, the S bits transmit X.21 control information. The MS comprises a determined filtration procedure for receiving the CT106 and CT109 statuses and the X.21 indication.

Some of the control bits in the V.110 frame have also been redetermined in such a way that they transmit synchronization information that is needed to control data transmission using several parallel traffic channels. This multichannel data transmission and the related synchronization are described for example in Finnish patent application 945817. Since in HSCSD service practically the same status data is transmitted via several parallel traffic channels in the data transmission mode, the frames of each traffic channel comprise "extra" redundant status bits that can be deleted without any effect on the number of the repeated status bits or on the bit-error-ratio of the status signals. For example in the case of two parallel channels, a double number of status bits are transmitted, and therefore half of the bits will be redundant. These redundant status bits can be used for intersubchannel synchronization by means of channel and frame numbering transmitted in the frames. The status bits can be selected for this purpose in several ways. For example bits S1, S4 and S6 may be used for channel numbering and one of the X bits may be used for 1-bit frame numbering within a channel.

It should be noted that the above-described status bits of the V.110 frame are only an example of terminal interface status information and of other information that would normally have to be transmitted in V.110 frames or in any other frames through a traffic channel. It is not essential to the invention what the status information or other possible control and synchronization information to be transmitted in addition to the user data actually contains. The invention is applicable more generally for transmitting all types of overhead information.

A GSM traffic channel thus comprises additional capacity for transmitting the required status and synchronization information in addition to the user data. Problems occur when a radio interface other than the GSM radio interface is used, and the data rate of the traffic channel of the interface is equal to the user data rate at the terminal interface, e.g. 4800 bit/s, as illustrated generally in the block diagram of FIG. 3. The traffic channel has no extra capacity that could be used to transmit other information in addition to the 4800 bit/s data. In practice, the data rate on the traffic channel should be reduced to 2400 bit/s.

Figure 4:
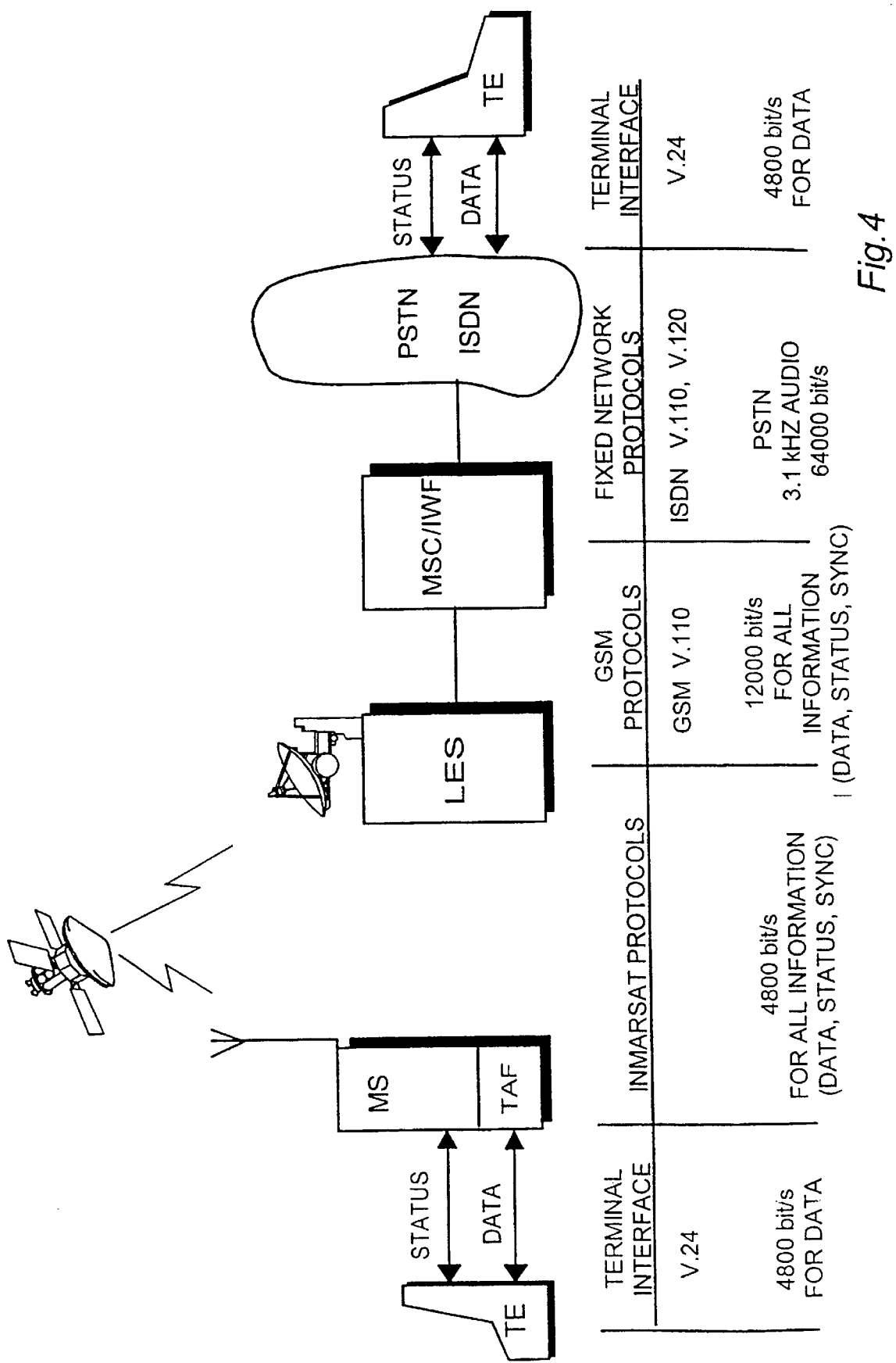
FIG. 4 is a block diagram showing how the Inmarsat-P satellite system is connected as a base station system to a GSM-based mobile system.

A practical example of a system where the Inmarsat-P satellite system is connected as a base station system to a GSM-based mobile system is shown in the block diagram of FIG. 4. In the Inmarsat satellite system, radio coverage is obtained by satellites instead of base stations located on the ground, the satellites being on an orbit circling the earth and transmitting radio signals between MSs (or user terminals UT) and LESs. The beam of the satellite forms a coverage area, i.e. a cell, on the earth. The coverage areas of individual satellites are arranged to form continuous coverage so that an MS is at all times located within the coverage area of at least one satellite. The number of the satellites required depends on the desired coverage. Continuous coverage on the surface of the earth might require for example 10 satellites. FIG. 4 shows, for the sake of clarity, only one LES, one satellite SAT and one MS. The LES is connected to the MSC of the GSM network in the same way as the BSS in FIG. 1. Also the GSM protocols between the MSC and the LES are the same as between the MSC and the BSS in FIG. 1 (GSM V.110). The terminal interface and the protocols thereof (asynchronous START/STOP) and the protocols of the fixed network (ISDN V.110/V.120 or PSTN 3.1 kHz audio) are also the same as in FIG. 1. The difference is that in FIG. 4 the GSM V.110 connection is not used over the entire connection between the MSC and the MS but the radio interface between the LES and the MS uses the Inmarsat protocols and traffic channels.

A radio interface consists of a bidirectional satellite radio connection between an MS and an LES. The exact structure or operation of the units SAT, LES and MS in the satellite system or the accurate specifications of the radio interface are not relevant to the present invention. The invention does not require changes in the actual satellite system the details of which can be obtained from the Inmarsat specifications. The only feature essential to the invention is the capacity of the traffic channel formed over the radio interface. The maximum data rate of a traffic channel in the Inmarsat-P system is 4800 bit/s, which creates the problem described in general in connection with FIG. 3, i.e. the terminal interface statuses cannot be transmitted through the traffic channel when the user data rate is 4800 bit/s.

The arrangement according to the invention that also enables the transmission of the terminal interface status information without decreasing the user data rate lower than 4800 bit/s will be described below with reference to FIGS. 5 to 7.

In asynchronous transmission, the asynchronous data characters (DATA) of the terminal interface are provided with start bits START and stop bits STOP, as illustrated in FIG. 5.

When asynchronous characters are transmitted through a synchronous traffic channel, an asynchronous-to-synchronous conversion is required at the transmitting end. This conversion determines the rate adaptation, underspeed handling and overspeed handling. Underspeed handling means that additional stop bits (STOP) are added between the asynchronous characters before transmission. Overspeed handling means that STOP bits are sometimes removed from between the asynchronous characters before transmission. Such a conversion is defined for example in the ITU-T recommendation V.14 that also sets the limits to the underspeed and the overspeed.

In the invention, the transmission of the V.24 terminal interface status information and the other possible control or synchronization information is carried out utilizing this asynchronous-to-synchronous conversion. Examine first the uplink transmission direction from an MS to an LES. The MS first receives from the terminal interface asynchronous characters according to FIG. 5 and status signals. The MS deletes as many start bits (START) and stop bits (STOP) from between the asynchronous characters 1 to N as allowed by the specifications of the asynchronous-to-synchronous conversion used. This procedure releases bit positions (decreases the data rate of the payload signal) for the addition of overhead information. The MS then concatenates the asynchronous characters 1 to N that lack START and STOP bits, as shown in FIG. 6. The terminal interface status information and the other possible control or synchronization information, the so-called OVERHEAD INFO, is then concatenated with these concatenated data characters. The number of the overhead information bits is such that it can be transmitted with the transmission capacity released by the deleted START and STOP bits. The concatenated asynchronous data characters, the status information and the possible other control and synchronization information are provided with a common START bit and a common STOP bit so that a new protocol data unit PDU according to FIG. 7 is formed. Standard underspeed and overspeed procedures are applied to this PDU in the same manner as to a single data character. In other words, STOP bits can be deleted from between the protocol data units PDU according to FIG. 7 or extra STOP bits can be added thereto. Also, standard rate adaptation is applied to this new protocol data unit PDU, i.e. STOP bits can be added between the protocol data units. The MS transmits the processed protocol data units PDU through a synchronous traffic channel or a set of traffic channels in a satellite system (via a satellite SAT) to the LES.

The LES is synchronized with the START bits and it carries out operations that are reverse with respect to those performed by the MS. In other words, the LES extracts the asynchronous data characters and the OVERHEAD information (terminal interface status information and other possible control and synchronization information) from the protocol data unit PDU according to the invention. The LES thereafter adds the START and STOP bits to the data characters and adapts the data characters and the status information and the possible other control or synchronization information to the V.110 frame according to FIG. 2. More precisely, the data characters are inserted in data bits D1 to D48 and the status and other information is inserted in S and X bits. The MS transmits the V.110 frame to the MSC by using the GSM protocols and traffic channels.

If the transmission is high-rate transmission employing a multichannel connection, the aforementioned other control or synchronization information contains interchannel synchronization information, as described in connection with FIG. 2. The MSC then uses this information to restore the order of the data bits received from different channels.

In the opposite transmission direction from the MSC to the MS (downlink direction) the procedure is reverse. The LES receives a V.110 frame that is formed into the PDU of FIG. 7. More precisely, the LES obtains the data characters according to FIG. 5 from data bits D1 to D48 in the V.110 frame, removes the START and STOP bits and concatenates the data characters in the manner shown in FIG. 6. The LES then concatenates the status information and the possible other control and synchronization information obtained from bits S and X in the V.110 frame with the concatenated data characters shown in FIG. 6. The LES then adds a START bit and a STOP bit that are common to the concatenated data characters and overhead information, and the result is the PDU according to FIG. 7. The LES handles the PDU in the same manner as a data character and transmits it through a satellite connection to the MS.

The MS is synchronized with the START bits and it performs operations that are reverse with respect to those carried out by the LES. In other words, the MS extracts the asynchronous data characters and the OVERHEAD information (the terminal interface status information and other possible control and synchronization information) from the protocol data. unit PDU according to the invention. The LES thereafter adds START and STOP bits to the data characters and adapts the data characters and the status information to the terminal interface V.24.

If the transmission is high-rate transmission utilizing a multichannel connection, the aforementioned other control or synchronization information contains interchannel synchronization information. After having been synchronized with the START bits, the MS then extracts this information in order to be able to restore the order of the data bits received from the different channels.

The figures and the description related thereto are only intended to illustrate the present invention. The details of the invention may vary within the spirit and scope of the appended claims.

What is claimed is:

1. An asynchronous data transmission method for transmitting asynchronous data characters and status information of a terminal interface and possibly other control or synchronization information through a synchronous traffic channel or a set of synchronous traffic channels in a telecommunication system, comprising the steps of
A) at a transmitting end:
removing a predetermined number of start bits and stop bits from between said asynchronous data characters received from the terminal interface,
concatenating said asynchronous data characters lacking said start and stop bits, and said terminal interface status information and possibly other control or synchronization information into a protocol data unit beginning with a start bit and ending with a stop bit,
processing the protocol data unit according to an asynchronous-to-synchronous conversion,
transmitting the processed protocol data unit to a receiving end through said synchronous traffic channel or set of synchronous traffic channels,
B) at the receiving end:
extracting said asynchronous data characters, the terminal interface status information and the possible other control or synchronization information from said protocol data unit,
adding start and stop bits to said extracted asynchronous data characters in order to restore said original asynchronous data characters.

2. The method according to claim 1, comprising
transmitting a plurality of protocol data units between the transmitting and receiving ends through said set of traffic channels in accordance with the steps A and B,
transmitting inter-channel synchronization information as said possibly other control or synchronization information, restoring the order of data received through different traffic channels in said protocol data units according to said synchronization information.

3. The method according to claim 1, wherein the telecommunication system is a mobile system comprising an incompatible radio interface containing said traffic channel or set of traffic channels.

4. The method according to any one of the preceding claims, wherein said traffic channel is a traffic channel of a satellite system.

5. A telecommunication system having an arrangement for transmitting asynchronous data characters and status information of a terminal interface and possibly other control and synchronization information through a synchronous traffic channel or a set of synchronous channels, the arrangement comprising a transmission protocol utilizing an asynchronous-to-synchronous conversion, said transmission protocol comprising protocol data units for transmission over said traffic channel or set of traffic channels, each protocol data unit containing a predetermined number of terminal interface asynchronous data characters without start and stop bits, and said terminal interface status information and possibly other control or synchronization information, concatenated between a common start bit and a common stop bit.

6. The system according to claim 5, wherein
a transmitter is arranged to remove the start and stop bits from the asynchronous data characters of said terminal interface and to concatenate them with the terminal interface status information and possibly other control or synchronization information into said protocol data units beginning with the common start bit and ending with the common stop bit,
the transmitter is arranged to subject the protocol data units to the operations of the asynchronous-to-synchronous conversion and to transmit the protocol data units through said traffic channel or set of traffic channels to a receiver,
the receiver is arranged to unpack said transmitted protocol data units and to restore the start and stop bits to the asynchronous data characters.

7. The system according to claim 5 or 6, wherein the telecommunication system is a mobile system comprising an incompatible radio interface containing said traffic channel or set of traffic channels.

8. The system according to claim 7, wherein said incompatible radio interface comprises a satellite connection in a satellite system.

9. The system according to claim 8, wherein
said satellite system comprises at least one land earth station connected as a base station system to a mobile services switching center of the mobile system in such a way that the transmission protocols and traffic channels of the mobile system are in use between the land earth station and the mobile services switching center,
said incompatible radio interface is between the land earth station and a mobile station through a satellite repeater, and the traffic channels of the satellite system are employed in the radio interface,
said terminal interface is located between the mobile station and the terminal equipment and it uses standard terminal equipment protocols.

10. The system according to claim 9, wherein
the mobile station is arranged to remove the start and stop bits from the terminal interface asynchronous data characters and to concatenate them with the terminal interface status information and possibly other control or synchronization information into the said protocol data units beginning with the common start bit and ending with the common stop bit, the mobile station is arranged to subject the protocol data units to the operations of the asynchronous-to-synchronous conversion and to transmit the protocol data units through said traffic channel or said set of traffic channels in said satellite system to the land earth station, the land earth station is arranged to unpack said transmitted protocol data units and to restore the start and stop bits to the asynchronous data characters, the land earth station (LES) is arranged to insert the asynchronous data characters and said status information and the possible other control and synchronization information in a frame according to the transmission protocol of the mobile system and to transmit the frame to the mobile services switching center.

11. The system according to claim 9, wherein the land earth station is arranged to extract the asynchronous data characters and the terminal interface status information and the possible other control and synchronization information from the frame that is received from the mobile services switching center and that complies with the protocol of the mobile system, the land earth station is arranged to remove the start and stop bits from the asynchronous data characters and to concatenate them with the terminal interface status information and the possible other control and synchronization information into protocol data units beginning with the common start bit and ending with the common stop bit, the land earth station is arranged to subject the protocol data units to the operations of the asynchronous-to-synchronous conversion and to transmit the protocol data unit through a traffic channel or a set of traffic channels in said satellite system to the mobile station, the mobile station is arranged to unpack said transmitted protocol data units and to restore the start and stop bits to the asynchronous data characters, the mobile station is arranged to forward said asynchronous data characters and said status information through said terminal interface to said terminal equipment.

12. The system according to claim 5, wherein said possibly other control and synchronization information comprises inter-channel synchronization information for said set of traffic channels.

13. The system according to claim 10, wherein the land earth station is arranged to extract the asynchronous data characters and the terminal interface status information and the possible other control and synchronization information from the frame that is received from the mobile services switching center and that complies with the protocol of the mobile system, the land earth station is arranged to remove the start and stop bits from the asynchronous data characters and to concatenate them with the terminal interface status information and the possible other control and synchronization information into protocol data units beginning with the common start bit and ending with the common stop bit, the land earth station is arranged to subject the protocol data units to the operations of the asynchronous-to-synchronous conversion and to transmit the protocol data unit through a traffic channel or a set of traffic channels in said satellite system to the mobile station, the mobile station is arranged to unpack said transmitted protocol data units and to restore the start and stop bits to the asynchronous data characters, the mobile station is arranged to forward said asynchronous data characters and said status information through said terminal interface to said terminal equipment.

* * * * *